(12) United States Patent
Neyman (10) Patent No.: US 6,215,783 B1
(45) Date of Patent: Apr. 10, 2001

(54) PRIVATE IP TELEPHONY BACKBONE LINKING WIDELY-DISTRIBUTED ENTERPRISE SITES

(75) Inventor: Igor Neyman, Palo Alto, CA (US)

(73) Assignee: Genesys Telecommunications Laboratories, Inc., San Francisco, CA (US)

(*) Notice: Subject to any disclaimer, the term of this patent is extended or adjusted under 35 U.S.C. 154(b) by 0 days.

(21) Appl. No.: 09/191,308

(22) Filed: Nov. 13, 1998

(51) Int. Cl.[7] .................................................. H04L 12/64
(52) U.S. Cl. ......................................... 370/353; 379/93.16
(58) Field of Search ..................................... 370/352–356; 379/93.01, 93.05, 93.07, 93.15, 93.16

(56) References Cited

U.S. PATENT DOCUMENTS 5,867,495 * 2/1999 Elliott et al. ........................ 370/352
5,999,525 * 12/1999 Krishnaswamy et al. ........... 370/352

* cited by examiner

*Primary Examiner*—Melvin Marcelo
(74) *Attorney, Agent, or Firm*—Donald R. Boys; Central Coast Patent Agency (57) ABSTRACT

A hybrid IP backbone network spans geographic locations of two or more publicly-switched telephone networks and includes nodes with translation servers adapted to translate between data protocols compatible with the PSTNs and a data protocol compatible with the IP backbone network. Calls placed in one PSTN then may be routed to an IP node, translated to data-packet protocol, through the IP backbone to a second node having another translation server, and therethrough into another PSTN and thence to a final destination. In some embodiments data gateways and trunk gateways are also provided at and integrated with IP nodes in the IP backbone network.

6 Claims, 4 Drawing Sheets

PRIVATE IP TELEPHONY BACKBONE LINKING WIDELY-DISTRIBUTED ENTERPRISE SITES

FIELD OF THE INVENTION

The present invention is in the field of telephony communication and pertains more particularly to methods and apparatus for cost-effective telephony communication between widely-spaced corporate or enterprise sites.

BACKGROUND OF THE INVENTION

In the field of telephony communication, there have been many improvements in technology over the years that have contributed to more efficient use of telephone communication within hosted call-center environments and in networks between customer's sites. Many of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Dialed Number Identification Service (DNIS). If the call center is computer-enhanced (CTI) the phone number of the calling party may be used to access additional information from a customer information system (CIS) database at a server on the network that connects the agent workstations. In this manner information pertinent to a call may be provided to an agent, often as a screen pop.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional system is familiar to nearly all, and is often referred to in the art as Plain Old Telephony Service (POTS). In the POTS system calls are connection oriented lending to the preferred terminology, connection-orientated-switched-telephony or COST. The COST designation will be used extensively herein when describing typical connection orientated networks or calls.

The computer-simulated, or DNT systems, are familiar to those who use and understand computer systems. Perhaps the best example of DNT is telephone service provided over the Internet, which will be referred to herein as Internet Protocol Network Telephony (IPNT), by far the most extensive, but still a subset of DNT. DNT is a term used to describe basically any type of packet switched network whether public or private. Examples of DNT networks include the public Internet, Intranets, private company owned wide area networks (WAN's), and so on. These DNT networks may operate using several differing or combined protocol, but generally are supportive of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented as previously described. In the COST system, calls are placed and connected by a specific dedicated path, and the connection path is maintained over the time of the call. Bandwidth is thus assured. Other calls and data do not share a connected channel path in a COST system. A DNT system, on the other hand, is not connection oriented or dedicated in terms of bandwidth. That is, data, including audio data, is prepared, sent, and received as data packets. The data packets share network links, and may travel by varied and variable paths.

Under ideal operating circumstances a DNT network, such as the Internet, has all of the audio quality of conventional public and private intelligent telephone-networks, and many advantages accruing from the aspect of direct computer-to-computer linking. However, DNT applications must share the bandwidth available on the network in which they are traveling. As a result, real-time voice communication may at times suffer dropout and delay. This is at least partially due to packet loss experienced during periods of less than needed bandwidth which may prevail under certain conditions such as congestion during peak periods of use, and so on.

Recent improvements to available technologies associated with the transmission and reception of data packets during real-time DNT communication have enabled companies to successfully add DNT, principally IPNT capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities. However, COST telephony is, at this time, still the more reliable of the two methods, in terms of maintaining a connection, for practicing real-time telephony.

In typical call centers, DNT is often accomplished via Internet connection wherein IPNT calls may be placed or received. Call centers may also be linked to sub-networks, including private networks that are linked to the Internet. Data packets arrive at the call center after having traveled from node to node through the DNT network or networks, and must be sorted and assimilated at the call center on a PC/VDU (computer with display), or DNT-capable telephone. DNT-capable call centers are more appropriately termed communication centers in the art because of the added scope of media possibilities presented therein. Therefore, the term communication center will be used extensively hereinafter when describing such call centers.

In COST systems known to the inventor, intelligent routing rules have been extended into the network domain principally via the addition of CTI processing capability at the network level. For example, SCP's may be enhanced with a processor running varied software routines adapted to increase intelligence in call handling. Intelligent peripherals, statistical servers, transactional servers, and the like give added control regarding call handling to individual communication centers that support complimentary equipment and software.

Although COST telephony is, at this time, much more efficiently practiced in an intelligent network, there is often a price to be paid for the added conveniences. For example, a large, international corporation may have several sites operating in a wide-ranging geography, such as in several countries. These sites may comprise individual communication centers, or corporate sites hosting several local communication centers, including. As a convenience to callers (customers) who wish to avoid a long distance call, the corporation provides 1-800 numbers for them to use wherein a significant portion of the cost of the call is deferred back to the hosting company. A single corporation hosting multiple international sites looks at long distance phone charges very seriously. It is desired to devise ways to lower such long distance phone charges.

One method that has been tried is to link geographically remote sites to the Internet for the purpose of enabling IP telephony, including COST-to-IP conversion. While this may eliminate long distance charges related to COST calling, traffic is difficult to maintain, as many paths through the Internet lack sufficient bandwidth to successfully propagate real-time telephony, and measures for securing more bandwidth over a public packet network are not perfected. Losing connection between communicating parties is common, and latency issues are paramount. Moreover, inter-linking sites via the Internet does little to aid those calling from COST telephones as the same bandwidth unpredictability exists with converted COST calls. Other types of WAN's may be considered, but are generally designed for company-to-company networking and not used for public-access telephony.

What is clearly needed is a method and apparatus that eliminates COST associated long-distance telephony charges for both a calling party and a hosting enterprise via intelligent routing of COST calls over a private IP backbone to geographically diversified destinations. Such a method and apparatus would also allow DNT calls to travel over the same backbone assuring adequate, and in some cases, guaranteed bandwidth for the duration of such calls.

SUMMARY OF THE INVENTION

In a preferred embodiment of the present invention a telephony system is provided, comprising a packet data backbone network adapted to provide telephony communication between a first node and a second node in a data-network-telephony (DNT) protocol; a dual-protocol interactive voice response (IVR) server at the first node connected to both the packet data backbone and to a first Publicly-Switched Telephony Network (PSTN) and adapted to interact with callers from either network; a first node comprising a first IP router connected to the packet-data backbone network and a first protocol-translation server connected to the first IP router, the first protocol-translation server adapted to translate between a data protocol compatible with the first PSTN and a data protocol compatible with the packet-data backbone network, and connected to both the first PSTN and to the first IP router; and a second node comprising a second IP router connected to the packet-data backbone network and a second protocol-translation server connected to the second IP router, the second protocol-translation server adapted to translate between a data protocol compatible with a second PSTN and a data protocol compatible with the packet-data backbone network, and connected to both the second PSTN and to the second IP router. Calls placed in either the first or the second PSTN may be routed through the packet-data backbone network via the IP routers and the protocol-translation servers into the other PSTN.

3. In some embodiments one or both of the protocol translation servers are SS7 bridges. Also in some embodiments one or both nodes further comprise a trunk gateway connected to analog telephony equipment for translating calls between the IP router and the analog telephony equipment. Instill further embodiments one or both nodes further comprise a data gateway adapted to translate data-only calls between the IP router and data-only devices.

In another aspect of the invention an IP backbone node is provided, comprising an IP router having an IP port for connecting to an IP packet-data backbone network; and a protocol-translation server adapted to translate between a data protocol compatible with a publicly-switched telephony network (PSTN) and a data protocol compatible with the IP packet-data backbone network. The IP router and the translation server implemented as a single piece of computerized equipment. In some embodiments the backbone node further comprises a trunk gateway including a port for connecting to telephone equipment, the trunk gateway adapted to translate calls between the IP data protocol and analog telephony signals. In other embodiments the backbone node comprises a data gateway including a data port for connecting to data-only equipment, the data gateway adapted for translating data between the IOP data protocol and a data protocol required by the data-only equipment.

In yet another embodiment of the present invention an IP packet-data backbone network is provided, comprising at least two nodes connected by a high-speed packet-data link; and a protocol-translation server coupled to each node and adapted to translate between a data protocol compatible with a publicly-switched telephony network (PSTN) and a data protocol compatible with the IP packet-data backbone network. A telephone call originated in a first PSTN may thus be routed through one of the two nodes over the IP packet-data network and through the other of the two nodes into a second PSTN. In the backbone network there may be a trunk gateway integrated with one or both nodes, the one or more trunk gateways adapted to translate calls between the IP data protocol and analog telephony signals. There may further be a data gateway including a data port for connecting to data-only equipment, the data gateway adapted for translating data between the IOP data protocol and a data protocol required by the data-only equipment.

In yet another aspect a for routing telephone calls between a first and a second publicly-switched telephone network (PSTN), comprising steps of (a) sending a call placed in the first PSTN to a first protocol-translation server coupled to a first IP node of a data-packet network; (b) translating the call at the first translation server from a data protocol compatible with the first PSTN into a data protocol compatible with the data-packet network; (c) routing the call through the data-packet network to a second IP node coupled to a second translation server; (d) translating the call at the second translation server from the data protocol compatible with the data-packet network to a data protocol compatible with the second PSTN; and (e) routing the call to a final destination in the second PSTN.

The network and methods provided and disclosed in enabling detail below bring to the art a new way to route telephone calls.

DESCRIPTION OF THE PREFERRED EMBODIMENTS

According to an embodiment of the present invention, an IP intelligent network is provided and adapted to include innovative, computerized, gateway-nodes that act as three-way bridges between an IP network, a local COST network, and local private enterprise sites that may exist in a wide-ranging geographic architecture. By spanning such network connection over a wide, and perhaps international region, an international communication system (ICS) is created wherein long-distance charges associated with traditional COST telephony, as practiced on a COST network, may be largely alleviated. Various embodiments of the present invention are described and illustrated below.

Figure 1:
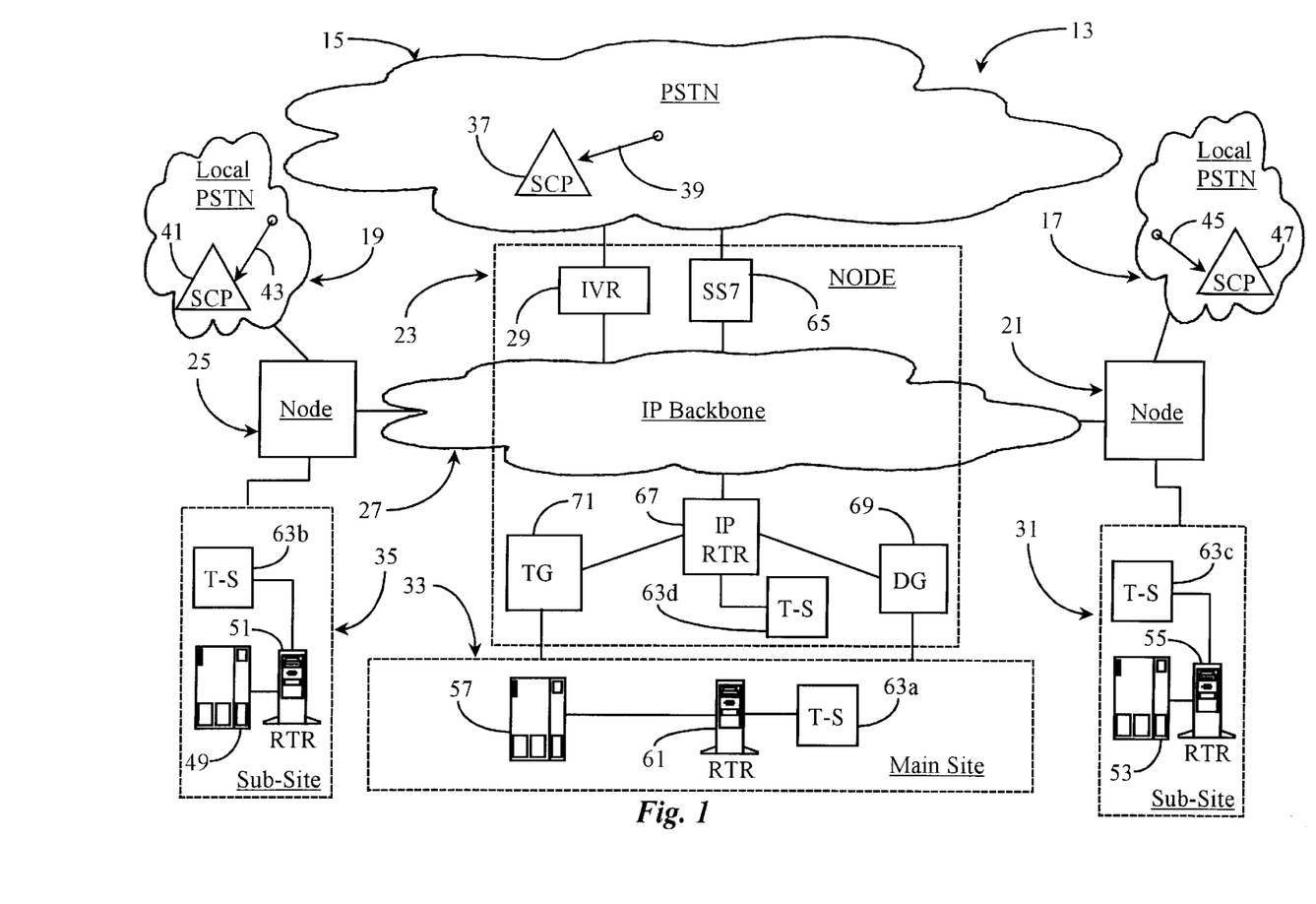
FIG. 1 is an overview of an international communication system according to an embodiment of the present invention.

FIG. 1 is an overview of an international communication system (ICS) 13 according to an embodiment of the present invention. ICS 13 is illustrated herein and is adapted to provide international communication between geographically distant locations. In this basic example, ICS 13 spans three international locations or countries wherein a host location provides a means of connectivity for the other locations. For example, ICS 15 comprises plural PSTNs 15, 17, and 19, an IP backbone 27, and a main corporate-site 33. PSTN 13, backbone 27, and site 33 are, for example, located in one country such as the USA. Similar component groupings illustrated within this embodiment and having separate element numbers such as a grouping comprising a Local PSTN 19, an IP Node 25, and a Sub-Site 35, and a grouping comprising a Local PSTN 17, an IP Node 21, and a Sub-Site 31 represent out-of-USA sites or locations such as, perhaps, Japan and Australia respectively, for exemplary purposes. It should be noted however, that the scope of the present invention is not limited to international communication. The three like groupings may exist in one country or geographic region that simply extends across telephony long-distance boundaries.

An enterprise site such as main site 33 may be a communication center or a corporate hub linking more than one communication center therefore, only representative equipment is illustrated therein, such as a switch 57 which may be a COST telephony switch, an IP switch, or a combination thereof depending on the capability of main site 33. Similarly, a router 61 illustrated therein may be an IP router, a COST router, or a combination thereof. The only requirement for a site such as main site 33 is that it supports connection to IP backbone 27 and a local PSTN or other common COST network.

IP Backbone 27 is a dedicated IP packet data network for traffic for one enterprise, such as for an International Company, or for a few enterprises sharing the backbone. The backbone may be leased lines from a network provider, for example, or a completely private network, such as an optical network extending to all of the corporate sites to be interconnected.

PSTN 13 is a public-access COST network and may take the form of a public COST network other than a PSTN such as are known in the art. PSTN 15 is connected to an IP backbone 27 through a unique communication-gateway IP node 23, hereinafter referred to as node 23. According to a preferred embodiment of the present invention, node 23 is provided in the form of a single computerized node adapted to route COST telephony and DNT, including IPNT telephony events back and forth between PSTN 15 and backbone 27, and linked destinations such as main site 33. However, in other embodiments, separate dedicated machines may be incorporated instead of one multipurpose machine.

Node 23, as illustrated herein, shows connection to corporate site 33 by way of a trunk gateway (TG) 71 and a data gateway (DG) 69. Both TG 71 and (DG) 69, which are described more fully below, show connection to an IP router 67, which is enhanced by a CTI-server 63d running an instance of functional software termed a T-Server by the inventor, which is also connected to IP backbone 27. Other illustrated components within node 23, are a novel, dual-ported Interactive Voice Response unit (IVR) 29, capable of interacting with both COST and DNT calls, and an SS7 gateway 65, show connected to PSTN 15 and to IP backbone 27 (connection from IVR and SS7 is through IP router 67 in actual practice). As one computerized unit, node 23 acts as an interfacing node that bridges PSTN 15, IP backbone 27, and main site 33. Further detail regarding components and connectivity with regard to node 23 is provided below.

IVR 29 is an innovative dual-ported unit, which, as previously described, may be a standalone unit or integrated with node 23. One port of IVR 29 is adapted and dedicated to enable communication with COST-callers over a standard COST network. The other port of IVR 29 is adapted and dedicated to communicating with COST callers over IP backbone 27, and therefore functions as a DNT port. Although not specifically illustrated in this embodiment, IVR 29 is connected to enhanced IP router 67, which is a component of IP backbone 27. The IVR connectivity as shown herein was drawn as such for simplification with regard to object placement within FIG. 1.

SS7 gateway 65 converts COST signal (typically Bellcore) into IP telephony format (data packets) for travel through IP backbone 27 and conversely, from IP protocol to Bellcore for travel through PSTN 15. Such gateways are known in the art and to the inventor. It will be apparent to the skilled artisan that, although certain data protocols predominate in COST systems, such as Bellcore, and in DNT systems, such as the IP protocol used on the Internet, these are not the only such protocols; and, depending on use, the SS7 gateway illustrated may, in some instances, translate between other protocols than those shown and described herein, within the spirit and scope of the invention.

Although not specifically shown here, SS7 gateway 65 is, in actual practice, connected through IP router 67 in the same fashion as described with reference to IVR 29 above. Similarly, the illustrated connections were drawn as shown only to simplify object placement.

IP router 67 is a packet network router, such as those provided by Ascend and others, that provides a gated entry-point to IP backbone 27. It is well-known in the art that such routers, interconnected, for IP networks such as network 27. In this case one router in the network is incorporated at each enterprise site as an entry/exit point to the IP backbone. For example, calls originating from outside a defined long-distance boundary and destined to a site such as main site 33 travel through IP backbone 27 and to IP router 67, on the way to site 33.

IP router 67 is enhanced by a connected CTI processor with an instance of a control software known to the inventor as T-Server or (T-S) represented by element number 63d. T-S 63d, and other such T-Servers in the IP backbone provide for intelligent routing to be implemented within IP backbone 27. T-S control is generally executed from within a main site such as would be the case, in this example, with main site 33. Instances of T-S routine are, in this embodiment, implemented at each IP router at an entry/exit point from IP backbone 27.

TG 71 and DG 69 are gateways to Main site 33 from IP router 67. For example, IP router 67 routes all COST interaction through TG 71 to main site 33. As a COST gateway, TG 71 converts IP data packets from router 67 into the well known plain-old-telephone-service (POTS) signal for transmission over one or more connected telephony trunks to a suitable telephony switch such as representative switch 57 illustrated in main site 33.

Referring back to the example of ICS 13 wherein it was described that the equipment grouping comprising PSTN 19, node 25, and sub-site 35 represented equipment located in Japan, it will be readily apparent that Local PSTN 19 represents a local network in Japan, which is capable of interacting on overseas connections with PSTN 13 in the USA. Sub-site 35 represents a corporate affiliate or subsidiary to main site 33. At the opposite end, local PSTN 17 represents a local switched network in Australia, for our example, and sub-site 31 is likewise an affiliate or a subsidiary site to main site 33. In this example, main site 33 may exert certain control over it's subsidiaries by virtue of T-Servers connected to IP routers at the various nodes.

Nodes 25 (Japan) and 21 (Australia) are quite similar to node 23 (USA) with an exception of not necessarily incorporating an IVR. That is, node 23 incorporates IVR 29 which, in this embodiment, is shared by all international sites. This arrangement is not required to practice the present invention, but rather a convenience in that sharing IVR 29 contributes to a cost savings for the hosting corporation. In other embodiments there may well be IVRs operable for enterprise purposes in some of, or all of the corporate sites outside the US.

In a preferred embodiment, in each respective PSTN such as PSTNs 15, 17, and 19, there are SCP's adapted to receive calls from callers using a 1-800 number or an equivalent. These are SCP 37 (PSTN 15), 47 (PSTN 17), and 41 (PSTN 19). Incoming calls in each respective PSTN are illustrated via vectors 39, 45, and 41. A connection is shown from each local PSTN 19 and 17 to each illustrated node 25 and 21 respectively. Nodes 25 and 21 are analogous to node 23 except for the IVR in this example.

Connections from nodes 25 and 21 to sub-sites 35 and 31 respectively, illustrate TG and DG gateway connections such as are illustrated with respect to node 23, TG 71, DG 69, and main site 33. Representative equipment located within sub-sites 35 and 31 are equivalent to representative equipment as described with reference to main site 33. For example, sub-site 35 contains a representative switch 49, connected to a router 51 running an instance 63b of T-S. Sub-site 31 contains a representative switch 53 connected to a router 55 running an instance of T-S 63c. In this example then, all sites 35, 33, and 31 are enhanced with T-S control routines 63a–c. Moreover, all IP-connected gateway nodes such as nodes 25, 23, and 21 are T-S enhanced. In this way, main site 33 (USA) may supply and control routing intelligence within backbone 27 and within international sub-sites such as site 35 (Japan) and site 31 (Australia).

It is an object of the present invention to provide a connection from a PSTN caller to a long distance destination by routing the call onto an IP backbone wherein the call may be transmitted to the destination without incurring COST-related network charges. As an example, assume a caller in Australia places a call 45 to SCP 47 in PSTN 17 in Australia. SCP 47 notifies IP node 21 of the call based on instruction attributed to the 1-800 number used by the caller, and opens a connection. Node 21 by virtue of an SS7 gateway and an IP router (analogous to gateway 65 and router 67 of node 23) invokes IVR 29 over IP backbone 27 to interact with the caller before call 45 is further routed from SCP 47. IVR interaction may be of the form of voice response, touch tone response, or another such known method.

IVR 29, as seen in FIG. 1, is a part of node 23 at what may, in this example, be assumed to be Corporate Headquarters, and is connected to IP backbone 27 via IP Router 67, as is SS7 gateway 65. IP Router 67 is CTI-enhanced by T-S 63a, which may communicate over the IP backbone and through node 21 with SCP 47, such that SCP 47 receives the intelligence of the pre-processing of IVR 29 for the incoming call. SCP 47 may thus route the incoming call to any location connected to IP backbone 27 via any gateway node.

As one narrow example, assume the Australian caller is seeking technical service for a product purchased, and the service site is sub-site 35 (Japan). Then SCP 47 will know that the call-destination for call 45 is sub-site 35 when the caller chooses the service option.

Assuming then, that it is determined that call 45 is a service call to site 35, SCP 47 connects the call through node 21 via the incorporated SS7 gateway in this instance, over IP backbone 27 to node 25 in Japan. An IP router in node 25 (analogous to router 67, node 23) switches the call through one of two gateways (TG or DG) based on pre-defined criteria such as the capability status of sub-site 35 for receiving COST, IPNT, or both. For example, if sub-site 35 is a COST-only communication center, then event 45 is routed through a trunk gateway to switch 49, which in this case, will be a COST switch. Once the event (call 45) is received at switch 49, router 51 may determine further routing to a next available service agent, or according to other enterprise rules.

When a service agent picks up call 45, then communication can commence as though call 45 is through COST trunks and switching apparatus, as though there were a dedicated connection. Assured latency guarantees (dedication of sufficient bandwidth for all calls) over backbone 27 insure optimum call quality over the private network.

In a more advanced embodiment of the present invention, each connected SCP such as SCP 47 may be enhanced with a CTI processor running an instance of T-S with a parallel data connection to a closest IP node or nodes such as node 21. In this way, more IVR intelligence may be utilized for routing purposes, as well as other intelligent routing schemes such as call load balancing, error routing, call priority routing, and so on. Such parallel data connections from T-S enhanced SCP's to associated nodes enables all T-S enhanced machines in ICS system 13 to communicate with each other and share data. This is accomplished principally over IP backbone 27, through data gateways in nodes to sites, and over additional separate data connections to CTI processors connected to SCP'S. The inventors have chosen not to illustrate T-S enhancement in the PSTN solely for the purpose of illustrating a simplest of embodiments with regard to ICS 13.

In the case of sharing IVR 29 through IP backbone 27, appropriate language options can be presented to callers from other countries. In a more complex embodiment, each node such as nodes 25 and 21 may include an IVR function without departing from the spirit and scope of the present invention. Similarly, an IVR function may be provided at one or more connected SCPs such as SCP 47, if CTI enhanced. However, the method and apparatus of the present invention may be adequately practiced in it's simplest form as taught herein.

It will be apparent to one with skill in the art that there may be many more IP nodes, main sites, sub-sites, and connected SCP's involved in an ICS such as ICS 13 than is illustrated herein without departing from the spirit and scope of the present invention. For example, a single IP node such as node 25 may link more than one sub-site. In one embodiment, an IP node such as node 25 may be a gateway to other networks having altered or modified protocol. To further illustrate, a TG such as TG 71 may be a gateway to a private COST network. A DG such as DG 69 may be a gateway to a secure WAN, and so on. There are many variant possibilities within the scope of the invention.

Figure 2:
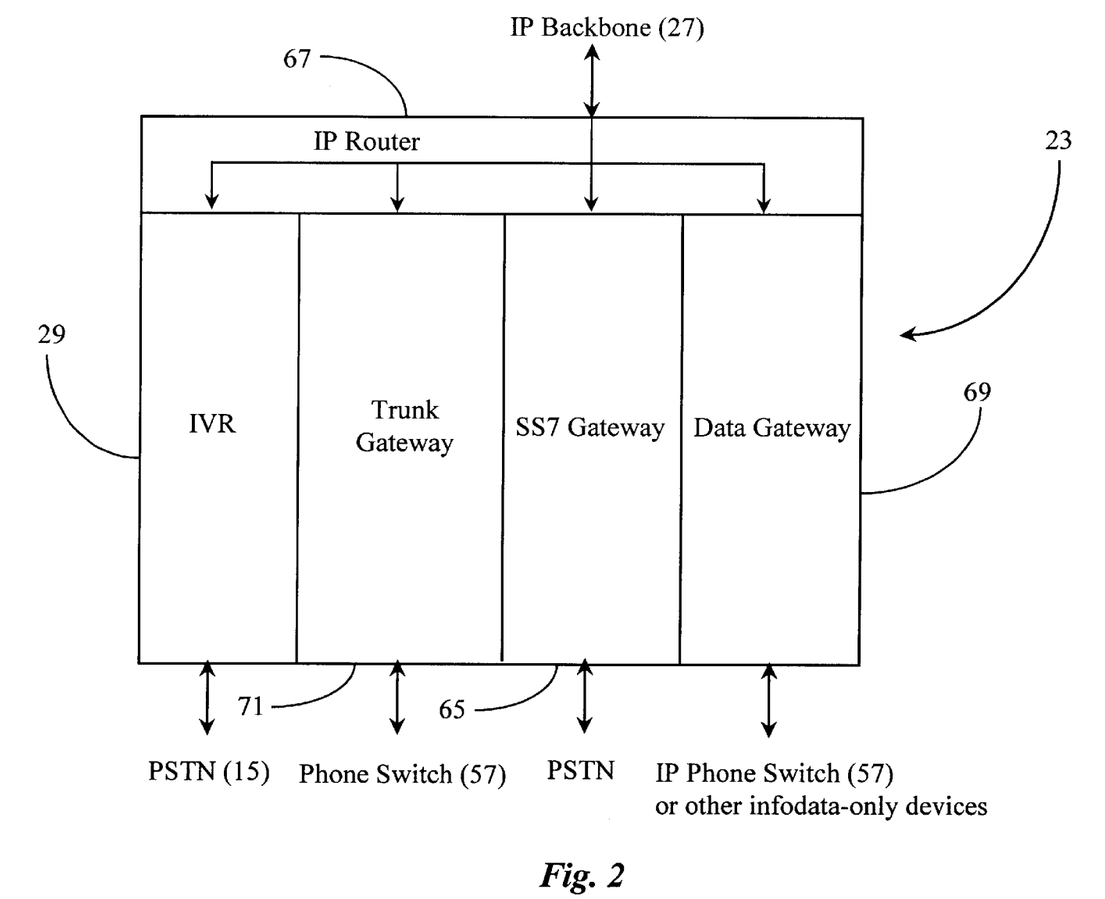
FIG. 2 is a block diagram illustrating components and data direction of IP node 23 of FIG. 1 according to an embodiment of the present invention.

FIG. 2 is a block diagram illustrating components and data direction of IP node 23 of FIG. 1 according to an embodiment of the present invention. IP node 23 is an IP node associated with a main or controlling site such as site 33 (USA) of FIG. 1. In this example, IVR 29 is a component not present in other connected nodes. IVR 29 is innovative in that it has two ports connecting to networks of incompatible protocol; in this case a COST network and a DNT network, and dual capability in communicating with callers from both networks. For example, callers using IP backbone 27 may access IVR 29 through IP router 67. On this side, IVR 29 functions according to the requisite DNT protocol for the private packet network. COST callers from PSTN 15 may interact with IVR 29 through a standard telephony connection port as is known in the art.

Trunk gateway 71 is a bi-directional gateway responsible for providing analog (POTS) signal to a COST switch such as representative switch 57 in main site 33 after it is converted from, for example, IP data-packets which arrived from IP backbone 27. Conversely, TG 71 may convert analog (POTS) signal to IP format for travel over IP backbone 27. Directional arrows illustrate direction of data flow. Actual data conversion may be accomplished within TG 71 or within IP router 67 as an alternative option. It is important to note here that when making outbound calls from a site having connection to a node such as node 23, these will be routed through TG 71 rather than through SS7 gateway 65. This is because TG 71 is dedicated to gating communication between customers calling from IP backbone 27 and agents working in or associated with a site such as Main site 33.

Data gateway (DG) 69 is a bi-directional gateway allowing data flow from IP backbone 27 into an IP switch such as representative switch 57 of FIG. 1. Data may also be sent to IP backbone 27 through DG 69 from IP switch 57. The bi-directional arrows illustrate the above described capability. It is noted here, as a reminder, that switch 57 was described as representative with regard to FIG. 1 meaning that it may be a COST switch, an IP switch, or a dual purpose switch (COST and IP capability). DG 69 also translates and routes data to all devices and services that are essentially such as 10BaseD protocol.

SS7 gateway 65 is a bi-directional gateway as illustrated via directional arrows. SS7 gateway 65 converts Bellcore (in this example) signals (COST standard) into IP format (data packets) for transfer onto IP backbone 27. Conversely, IP data may also be converted to Bellcore signal for transmission into PSTN 15. In a case such as this, a caller from PSTN 17 of FIG. 1 may be calling a person in PSTN network 15. Perhaps the recipient of the call is a remote agent working from his home. T-S enhancement 63d added to IP router 67 enables such intelligent routing to remote sites in PSTN 15. In a case such as this, it may be understood that PSTN numbers connecting off-site agents are validated within the network. This may protect against abuses of the ICS system.

Figure 3:
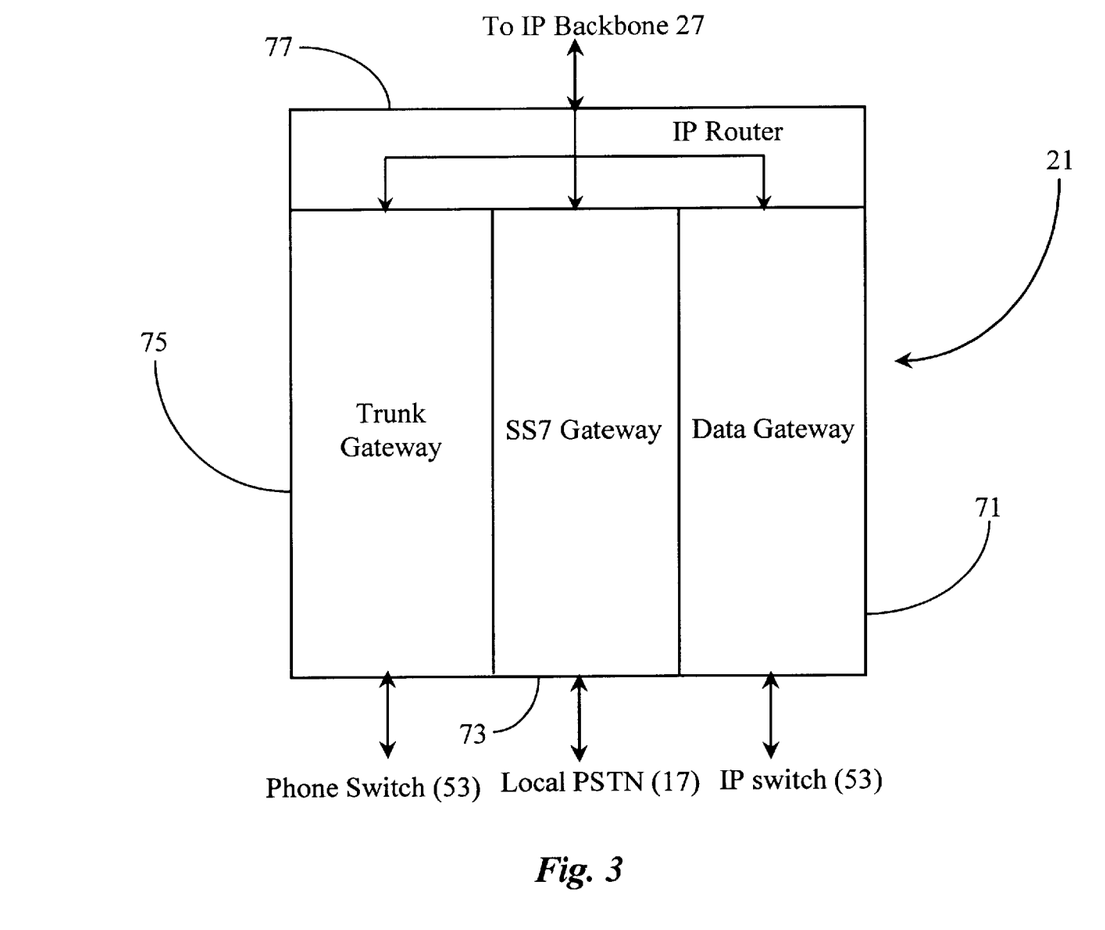
FIG. 3 is a block diagram illustrating components and data direction of IP node 21 of FIG. 1 according to an embodiment of the present invention.

FIG. 3 is a block diagram illustrating components and data direction of IP node 21 of FIG. 1 according to an embodiment of the present invention. IP node 21 is virtually identical in function and construction to IP node 23 of FIG. 2 except the there is no IVR function. For this reason, much repetitive description will not be provided to analogous components as a brief listing should suffice.

An IP router 77 is provided to interface with IP backbone 27. Although not shown in FIG. 3, IP router 77 is enhanced with an instance of T-S control routine as previously taught with regard to FIG. 1. A trunk gateway (TG) 75 is provided as a bridge to a telephony switch such as telephony switch 53 of FIG. 1, or as a bridge to a separate COST network such as a private network. An SS7 gateway 73 is provided between IP backbone 27 and local PSTN 17. A Data gateway 71 is provided as a bridge to an IP switch 53 of FIG. 1, or as a bridge to a separate data network such as a private WAN. In the event that switch 53 of FIG. 1 is a dual purpose switch (COST and IP capable), then TG 75 and DG 71 will both connect to switch 53. In an alternate embodiment, two separate switches representing each type of network could be provided. Switch 53 as illustrated with regard to FIG. 1 is representative only.

It will be apparent to one with skill in the art that IP router 77, TG 75, SS7 73, and DG 71 may be provided of the form of separate but connected machines without departing from the spirit and scope of the present invention. However, incorporating each listed capability into one machine is preferred in some embodiments, and particularly innovative in this instance.

It will also be apparent to one with skill in the art that callers from a WAN such as the Internet may gain access to IP backbone 27 through IP gateways (not shown) that may be adapted for that purpose. Motivation for IPNT calls arriving from the Internet may be simply that sufficient bandwidth may be assured for such calls, and in one embodiment of the invention an enterprise hosting such a private IP backbone system may provide connection for subscribers to place calls, thereby utilizing unused capacity during slack periods and deflecting costs.

Although much discussion has been devoted to real-time telephony, it will be apparent to one with skill in the art that non-real-time events such as facsimiles, voice mails, and the like may also be routed over IP backbone 27.

Figure 4:
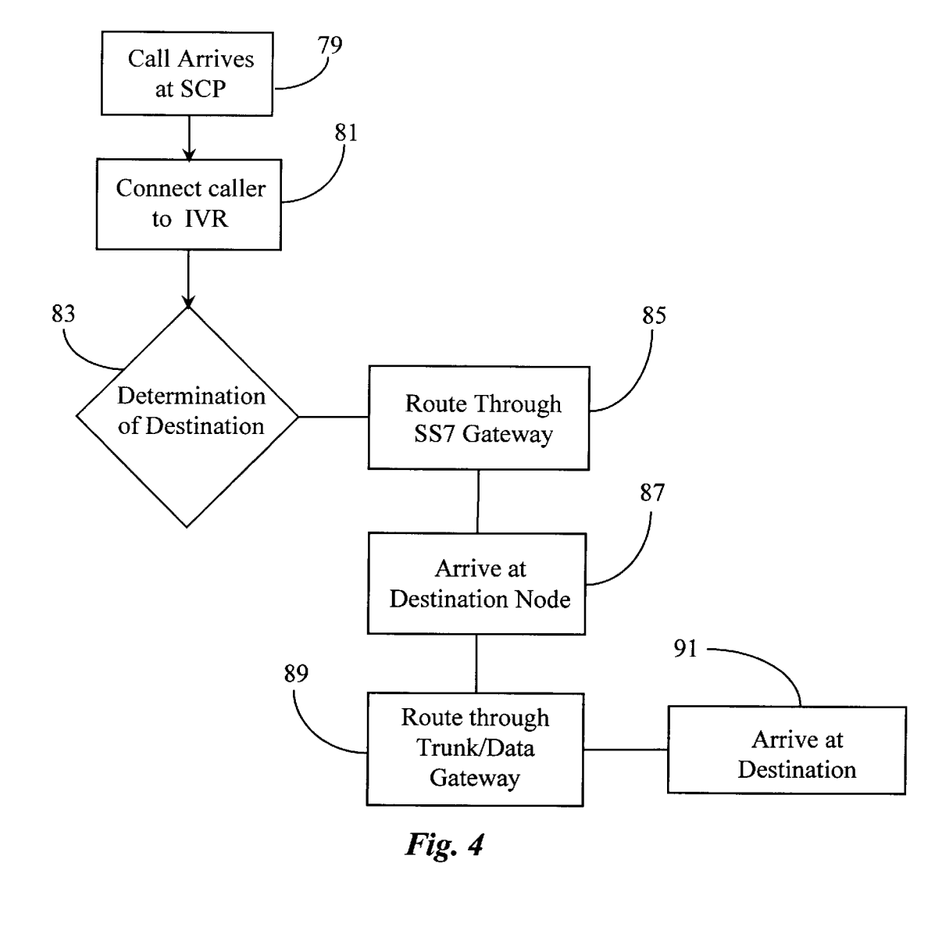
FIG. 4 is an exemplary flow chart illustrating a call routing sequence according to an embodiment of the present invention.

FIG. 4 is an exemplary flow chart illustrating a call routing sequence using an ICS according to an embodiment of the present invention. In step 79 a call to a provided 1-800 number or equivalent arrives at an ICS connected SCP such as SCP 41 of FIG. 1. In a simple embodiment, such an SCP is pre-programmed to recognize the provided 1-800 number and route according to pre-defined instruction associated with the number including possible destinations which are constrained options according to information to be elicited from a caller.

In step 81, a shared IVR such as IVR 29 of FIG. 1 is notified of the call at the SCP. This notification is accomplished over an IP backbone such as backbone 27. The SCP, in this case, has connected the caller to IVR 29 through an SS7 gateway such as gateway 73 of FIG. 3 and the IP backbone. When a connection is made over the IP backbone, IVR 29 presents options to the caller.

At step 83, a determination is made based upon the caller's constrained-response option, and that information is communicated to the SCP intelligence. The call is then routed in step 85 onto the IP backbone through the SS7 gateway by the SCP, and arrives in step 87 at the IP node associated with the final destination.

At step 89 the arriving call is routed by virtue of a CTI-enhanced IP router in the destination node through one of the gateways (TG or DG) depending upon enterprise rules, or alternatively onto the PSTN local to the node through the associated SS7 gateway. At step 91, the call arrives at its destination, which may be an appropriate switch such as switch 49 of FIG. 1. Data router 51 may then affect further routing to a next available agent skilled to handle the call.

The routing sequence described above is exemplary only and represents just one basic example of many possible sequences. Criteria such as call destination, communication center capability, special routing rules in effect, among other considerations, may effect description and order of steps in routing. For example, a caller may use a provided 1-800 number to reach an SCP such as SCP 37 (FIG. 1), 1 and be intercepted via IVR 29 (FIG. 1). Through interaction with IVR 29, it may be determined that the call is actually to a local communication center or site such as may be the case with site 33 (FIG. 1). In this case, IP backbone 27 (FIG. 1) would not be used to carry the call. The call would simply be placed through PSTN 13 (FIG. 1) to switch 57 (FIG. 1). This, of course assumes that switch 57 has a trunk connection to the local PSTN.

It will be apparent to one with skill in the art that an international communication system such as ICS 13 may span many countries and link to many corporate sites without departing from the spirit and scope of the present invention, or may be of more local character. Such linked sites may be communication centers wherein COST telephony, DNT telephony, or a combination thereof is practiced. Such sites may also be corporate hubs comprising gateways to still other communication networks of various protocol, wherein further routing accomplishes connection to various communication centers.

It will also be apparent to one with skill in the art that routing intelligence as provided and taught herein by virtue of the implementation of T-S control routines may be extended to ICS-connected SCPs in local PSTN networks inherent to international sites with out requiring an extensive and separate digital network linking the enhanced machines. For example, a data connection could extend from each connected SCP to the closest T-S enhanced node or nodes with further T-S communication between machines taking place over the IP backbone.

Components of an ICS system, namely IP backbone equipment and connections, may be privately owned, shared by several owners, leased from a network provider, and so on. A system such as system 13 may contain the sites of one corporation, several cooperating corporations, or may be provided as a subscription service for companies and individuals.

There are many variant possibilities. Therefore, the present invention should be afforded the broadest scope in terms of innovation and application. The spirit and scope of the present invention is limited only by the claims that follow.

What is claimed is:

1. A telephony system comprising:
    a packet data backbone network adapted to provide telephony communication between a first node and a second node in a data-network-telephony (DNT) protocol;
    a dual-protocol interactive voice response (IVR) server at the first node connected to both the packet data backbone and to a first Publicly-Switched Telephony Network (PSTN) and adapted to interact with callers from either network, providing routing intelligence to the network;
    a first node comprising a first IP router connected to the packet-data backbone network and a first protocol-translation server connected to the first IP router, the first protocol-translation server adapted to translate between a data protocol compatible with the first PSTN and a data protocol compatible with the packet-data backbone network, and connected to both the first PSTN and to the first IP router; and
    a second node comprising a second IP router connected to the packet-data backbone network and a second protocol-translation server connected to the second IP router, the second protocol-translation server adapted to translate between a data protocol compatible with a second PSTN and a data protocol compatible with the packet-data backbone network, and connected to both the second PSTN and to the second IP router;

wherein calls placed in either the first or the second PSTN may be routed through the packet-data backbone network via the IP routers and the protocol-translation servers into the other PSTN.

2. The system of claim 1 wherein one or both of the protocol translation servers are SS7 bridges.

3. The system of claim 1 wherein one or both nodes further comprise a trunk gateway connected to analog telephony equipment for translating calls between the IP router and the analog telephony equipment.

4. The system of claim 1 wherein one or both nodes further comprise a data gateway adapted to translate data-only calls between the IP router and data-only devices.

5. The system of claim 1 wherein one or both nodes further comprise both a trunk gateway connected to analog telephony equipment for translating calls between the IP router and the analog telephony equipment and a data gateway adapted to translate data-only calls between the IP router and data-only devices.

6. A method for routing telephone calls between a first and a second publicly-switched telephone network (PSTN), comprising steps of:

(a) sending a call placed in the first PSTN to a dual-protocol interactive voice response (IVR) server at a first node connected to both a packet data network and to the first Publicly-Switched Telephony Network (PSTN) and adapted to interact with callers from either network, determining the routing of the call in the network, and having a first protocol-translation server coupled to the first IP node of the data-packet network;

(b) translating the call at the first translation server from a data protocol compatible with the first PSTN into a data protocol compatible with the data-packet network;

(c) routing the call through the data-packet network by the (IVR) server to a second IP node coupled to a second translation server;

(d) translating the call at the second translation server from the data protocol compatible with the data-packet network to a data protocol compatible with the second PSTN; and (e) routing the call to a final destination in the second PSTN, as determined by the IVR.

* * * * *